(12) United States Patent
Hood et al.

(10) Patent No.: US 9,080,645 B2
(45) Date of Patent: Jul. 14, 2015

(54) COMPRESSED AIR DEVICE FOR ALLOWING THE EXPEDITIOUS ADJUSTMENT OF DRIVE BELTS

(75) Inventors: William Gregory Hood, Charlotte, NC (US); Timothy Eugene Hornbuckle, Charlotte, NC (US); Harold Edward Massey, Matthews, NC (US)

(73) Assignee: PATTON'S MEDICAL, LLC, Charlotte, NC (US)

( * ) Notice: Subject to any disclaimer, the term of this patent is extended or adjusted under 35 U.S.C. 154(b) by 646 days.

(21) Appl. No.: 13/182,496

(22) Filed: Jul. 14, 2011

(65) Prior Publication Data

US 2012/0014817 A1 Jan. 19, 2012

Related U.S. Application Data

(60) Provisional application No. 61/365,076, filed on Jul. 16, 2010.

(51) Int. Cl.
| | |
|---|---|
| *F16H 7/14* | (2006.01) |
| *F01C 21/00* | (2006.01) |
| *F04B 35/04* | (2006.01) |
| *F04B 39/14* | (2006.01) |
| *F04C 29/00* | (2006.01) |
| *F16H 7/08* | (2006.01) |

(52) U.S. Cl.
CPC ............... *F16H 7/14* (2013.01); *F01C 21/007* (2013.01); *F04B 35/04* (2013.01); *F04B 39/14* (2013.01); *F04C 29/005* (2013.01); *F16H 7/0827* (2013.01); *F04C 2240/80* (2013.01)

(58) Field of Classification Search
CPC ...... F01C 21/007; F04C 29/005; F04B 39/14; F04B 35/04; F16H 7/14; F16H 7/0827
USPC ......... 417/216, 223, 234, 286, 360, 362, 361; 248/346.01, 346.03, 346.06; 474/101, 474/114, 136
See application file for complete search history.

(56) References Cited

U.S. PATENT DOCUMENTS

| | | | | |
|---|---|---|---|---|
| 5,030,067 | A * | 7/1991 | Ushiota et al. | 417/313 |
| 5,551,845 | A * | 9/1996 | Milam | 417/290 |
| 7,275,735 | B2 * | 10/2007 | Brenneke et al. | 261/30 |
| 8,142,175 | B2 * | 3/2012 | Duppert et al. | 418/55.1 |
| 2007/0212235 | A1 * | 9/2007 | MacNeil | 417/361 |
| 2009/0136367 | A1 * | 5/2009 | Sakaguchi et al. | 417/359 |
| 2010/0090087 | A1 * | 4/2010 | Maier | 248/669 |
| 2010/0139298 | A1 * | 6/2010 | Lifson et al. | 62/115 |

* cited by examiner

*Primary Examiner* — Charles Freay
*Assistant Examiner* — Lilya Pekarskaya
(74) *Attorney, Agent, or Firm* — Clements Bernard PLLC; Seth L. Hudson (57) ABSTRACT

The present invention provides methods and systems for a device for producing compressed air that allows for the expeditious adjustment of a drive belt that includes a base having a substantially triangular shape with at least a first side having a top portion and a bottom portion, a second side having a top portion and a bottom portion, and a third side having a top portion and a bottom portion. The first side, second side, and third side collectively form a cavity therein. A motor is disposed within the cavity of the base and engaged to the first side of the base. A first compressor is slidingly engaged to the second side of the base and a second compressor is slidingly engaged to the third side of the base.

11 Claims, 8 Drawing Sheets

COMPRESSED AIR DEVICE FOR ALLOWING THE EXPEDITIOUS ADJUSTMENT OF DRIVE BELTS

CROSS REFERENCE TO RELATED PATENT APPLICATION

The current application claims the benefit of the earlier priority filing date of the provisional application Ser. No. 61/365,076, that was filed on Jul. 16, 2010.

FIELD OF THE INVENTION

The present invention relates generally to a compressed air device, and more particularly relates to a compressed air device that is compact and saves valuable space during operation and allows for the accurate, efficient, and expeditious adjustment of drive belts.

BACKGROUND OF THE INVENTION

The adjustment of belts on a piece of machinery can be a time consuming operation. This is especially so on a piece of equipment that is vital to the operation of a system or a business. For example, when the piece of equipment is supplying compressed air to a hospital, the hospital needs the compressed air to be pumped throughout the hospital continuously. The compressed air is pumped throughout the hospital by compressors that utilize drive belts. Because of the nature of the drive belts, they need to be changed periodically and this changing of the drive belts must be accurate, efficient, and expeditious. The present invention provides a device that is compact and allows the accurate, efficient, and expeditious adjustment of drive belts.

BRIEF SUMMARY OF THE INVENTION

According to an embodiment of the present invention, a device for expeditiously adjusting a drive belt is claimed that includes a base, a motor, at least one compressor mounted to the base, and an adjusting plate that is slidingly engaged to the base for adjusting the at least one compressor mounted to the base.

According to another embodiment of the present invention, the device for expeditiously adjusting a drive belt includes a plurality of sides forming a cavity therein.

According to yet another embodiment of the present invention, the device for expeditiously adjusting a drive belt includes a base that is generally triangular in shape.

According to yet another embodiment of the present invention, the device for expeditiously adjusting a drive belt includes an adjusting plate that is positioned underneath the base and engaged to the base with at least one fastener, whereby the adjusting plate is adjusted by the movement of the fastener.

According to yet another embodiment of the present invention, the device for expeditiously adjusting a drive belt includes at least one compressor that is engaged to the adjusting plate.

According to yet another embodiment of the present invention, the device for expeditiously adjusting a drive belt includes at base that is generally trapezoidal in shape.

According to yet another embodiment of the present invention, a device for producing compressed air that expeditiously allows for the adjustment of a drive belt that includes a base having a plurality of sides, a motor, at least one compressor mounted to the base that is operated by the motor, an adjusting plate that is slidingly engaged to a side of the base and engaged to the base with a fastener, whereby the adjusting plate is adjusted along a side of the base by way of the fastener.

According to yet another embodiment of the present invention, a device for producing compressed air that expeditiously allows for the adjustment of a drive belt that includes a base that is generally triangular in shape and consists of three sides forming a cavity therein for receiving the motor.

According to yet another embodiment of the present invention, a device for producing compressed air that expeditiously allows for the adjustment of a drive belt that includes at least two sides of the base that each comprise at least two slots for receiving a portion of the at least one compressor. The adjusting plate is disposed beneath the at least two slots for receiving and engaging the portion of the at least one compressor and allowing the at least one compressor and the adjusting plate to move along the side of the base for adjusting the at least one compressor.

According to yet another embodiment of the present invention, a device for producing compressed air that expeditiously allows for the adjustment of a drive belt that includes a first compressor and a second compressor, whereby the first compressor is mounted to one of the plurality of sides of the base and the second compressor is mounted to one of the plurality of sides of the base, and the motor is mounted to one of the plurality of sides of the base.

According to yet another embodiment of the present invention, a device for producing compressed air that expeditiously allows for the adjustment of a drive belt that includes a belt that is disposed between the at least one compressor and the motor, whereby the belt is mounted to a drive wheel of the motor and a compressor wheel on the compressor for operating that at least one compressor.

According to yet another embodiment of the present invention, a device for producing compressed air that expeditiously allows for the adjustment of a drive belt that includes a base that is generally trapezoidal in shape having a planar top portion for receiving the motor.

According to yet another embodiment of the present invention, a device for producing compressed air that expeditiously allows for the adjustment of a drive belt that includes at least one mounting foot that is engaged to the base for selectively securing the device to a structure.

According to yet another embodiment of the present invention, a device for producing compressed air that allows for the expeditious adjustment of a drive belt that includes a base having a substantially triangular shape with at least a first side having a top portion and a bottom portion, a second side having a top portion and a bottom portion, and a third side having a top portion and a bottom portion. The first side, second side, and third side collectively form a cavity therein. A motor is disposed within the cavity of the base and engaged to the first side of the base. A first compressor is slidingly engaged to the second side of the base and a second compressor is slidingly engaged to the third side of the base. At least one pair of slots is disposed on the second side of the base and at least one pair of slots is disposed on the third side of the base for receiving a fastener engaged to the first compressor and the second compressor. A first adjusting plate positioned on the bottom portion of the second side of the base that is engaged to the first compressor, and a second adjusting plate positioned on the bottom portion of the third side of the base that is engaged to the second compressor.

BRIEF DESCRIPTION OF THE DRAWINGS

The present invention is illustrated and described herein with reference to the various drawings, in which like refer

DETAILED DESCRIPTION OF THE INVENTION

Figure 1:
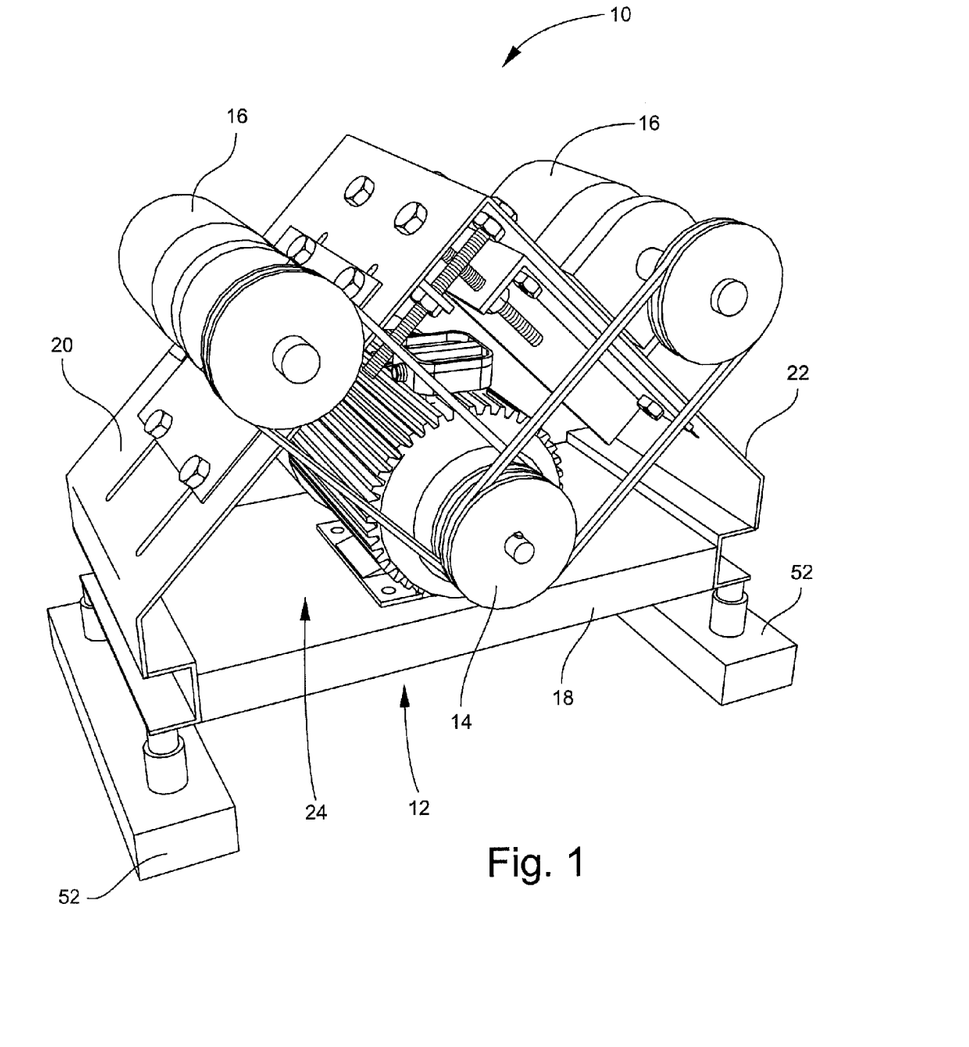
- FIG. 1 is a perspective view of the compressed air device.

Referring now specifically to the drawings, an improved compressed air device is illustrated in FIG. 1 and is shown generally at reference numeral 10. The device 10 includes a base 12, a motor 14, and at least one compressor 16, as shown in FIGS. 1-6. Preferably, the device 10 will include two compressors 16 that are mounted to the base 12. The base 12 may have a plurality of sides. As illustrated in FIG. 1, the base has a first side 18, a second side 20, and a third side 22. Each side (18, 20, and 22) has a top portion and a bottom portion. The top portion of the sides (18, 20, and 22) is the exposed portion or the portion that is more easily accessible to a user when the device 10 is in the upright position. By way of example, the motor 14 is positioned on the top portion of the first side 18, as illustrated in FIG. 1 and the compressors 16 are positioned on the top portion of the second side 20 and third side 22. The bottom portion of the sides (18, 20, and 22) is the portion opposite the top portion.

The base 12 may have any form, but as illustrated in FIG. 1, the base has a substantially triangular form. The term substantially triangular form means that the base includes three primary sides that may be adjacent to one another. In other words, the sides may intersect. The term substantially triangular form may also mean that the three primary sides do not intersect, but the planes of the sides intersect at a point or are an asymptote.

The sides (18, 20, and 22) of the base 12 are in a spaced apart relationship forming a void 24 within. As illustrated in FIG. 1, the motor 14 is positioned within the void 24 and is engaged to the top portion of the first side 18. The motor is fastened to the top portion of the first side by a bolt, screw, weld, or the like.

Figure 8:
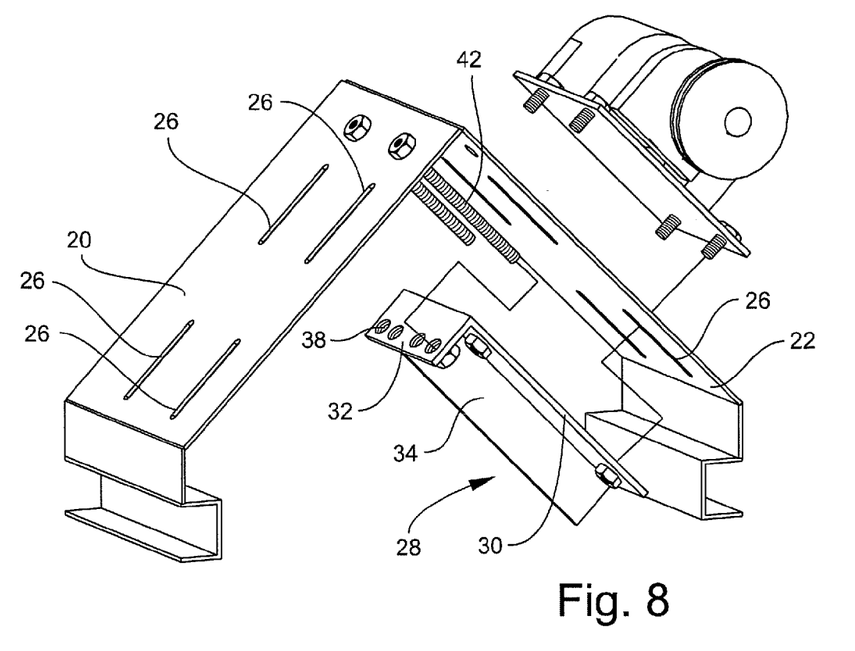
FIG. 8 is view depicting the engagement of a compressor and adjusting plate to the compressed air device.
Figure 9:
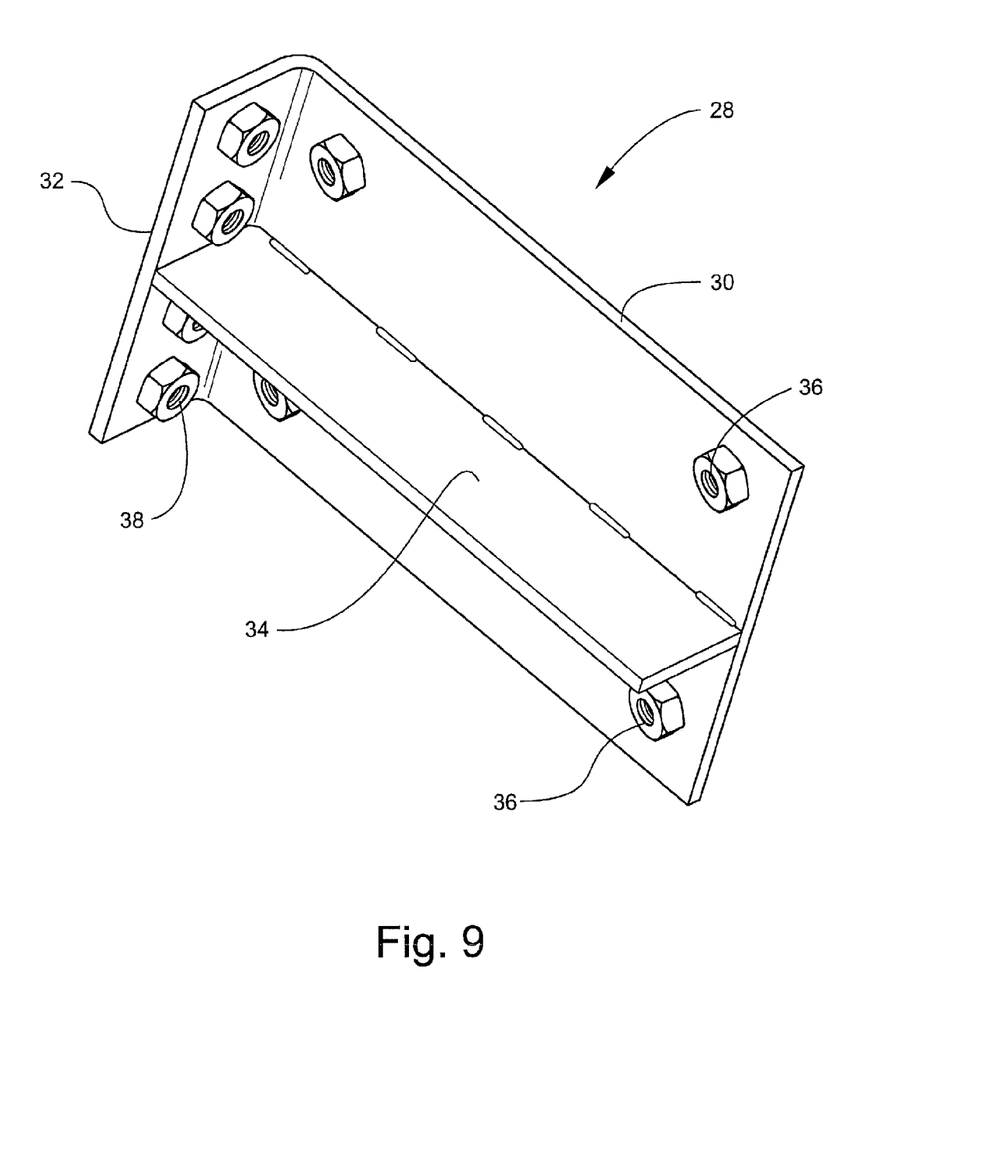
FIG. 9 is a perspective view of an adjusting plate.

The second side 20 of the base 12 includes at least one pair of slots 26. The third side 22 of the base 12 includes at least one pair of slots 26. Preferably and as illustrated in FIG. 8, the second side 20 and third side 22 of the base 12 includes two pairs of slots 26 disposed on each side (20, 22). Each compressor 16 preferably contains a fastener that extends from the bottom of the compressor 16. The fastener may be a belt, screw, threaded extension or the like. In the examples, a threaded extension is utilized as a fastener and extends from the compressor 16 and is inserted into the slots 26. By way of example only and as shown in the figures, the compressor 16 includes four (4) threaded extensions or bolts that extend downward and are inserted into the slots 26. Each bolt contains a threaded end for receiving a correspondingly threaded nut. The threaded extension also receives a correspondingly threaded nut.

Figure 10:
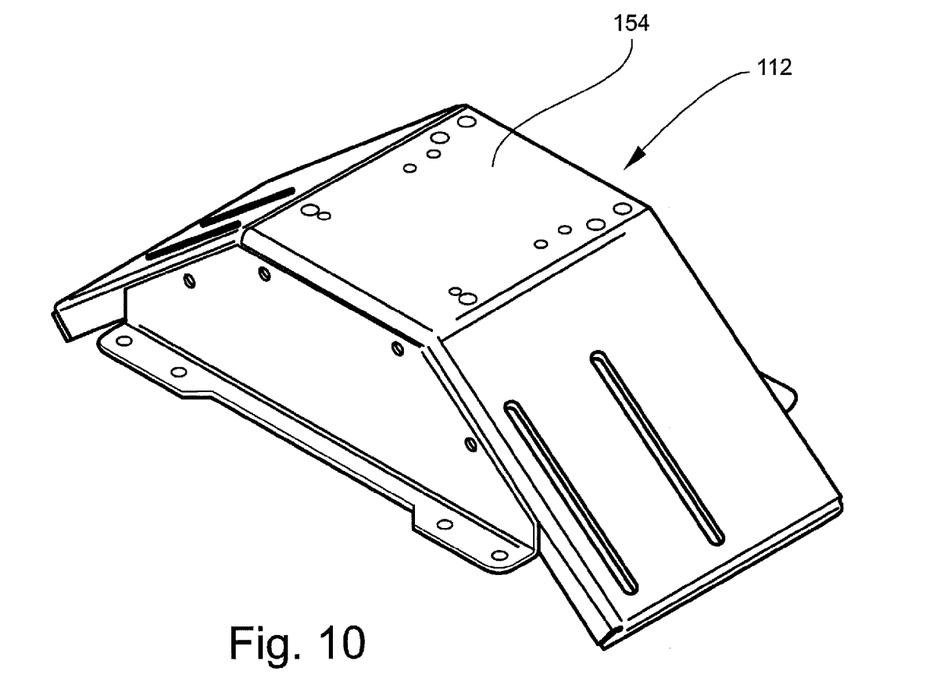
FIG. 10 is a perspective view of an another exemplary embodiment of a base for the compressed air device.

The compressors 16 are slidingly engaged to the top portion of the second side 20 and the top portion of the third side 22 of the base 12 with the use of an adjusting plate 28. As illustrated in FIGS. 8 and 10, the adjusting plate 28 comprises a face 30, a lip 32, and a rib 34. The face 30 of the adjusting plate 28 contains at least a pair of bores 36 for receiving the fastener that extends from the bottom of the compressor 16. Preferably, the face 30 of the adjusting plate 28 contains two pairs of bores 36 for receiving the fastener that extends from the bottom of the compressor 16. The lip 32 is positioned about 90° with respect to the face 30. The lip 32 contains at least one threaded bore 38. Preferably, the lip 32 contains two threaded bores 38. The rib 34 of the adjusting plate 28 is optional, but can be added to provide strength and stability to the adjusting plate 28.

During use, an adjusting plate 28 is positioned on the bottom side of the second side 20 of the base 12, and an adjusting plate 28 is positioned on the bottom of the third side 22 of the base 12, as shown in FIG. 8. The bores 36 of the adjusting plate 28 are aligned with the slots 26 of the second side 20 and third side 22 of the base 12. The fastener disposed on the bottom of the compressor 16 is received within the slot 26 of the sides (20, 22) and the bore 36 of the adjusting plate 28. As set forth above and by way of example only, the fastener is a threaded fastener engaged to the bottom side of the compressor 16 and when the threaded fastener is inserted through the slot 26 and bore 36; a nut may be selectively secured to the threaded fastener, thus allowing the compressor 16 to be selectively secured or engaged to the adjusting plate 28.

Figure 5:
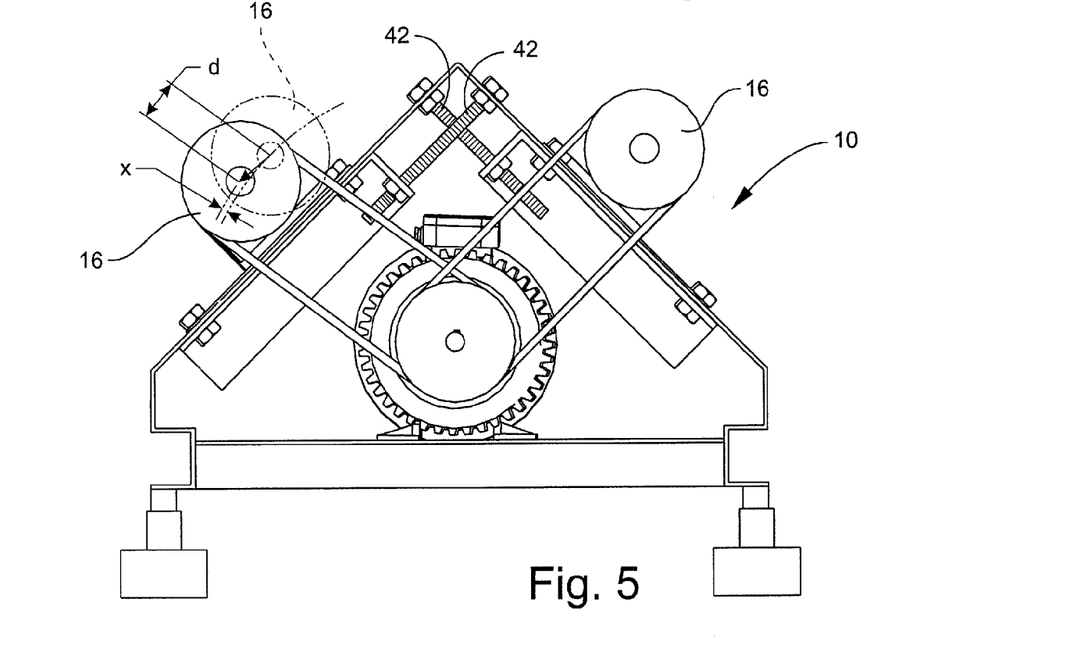
FIG. 5 is another front view of the compressed air device depicting the translation of a compressor.
Figure 6:
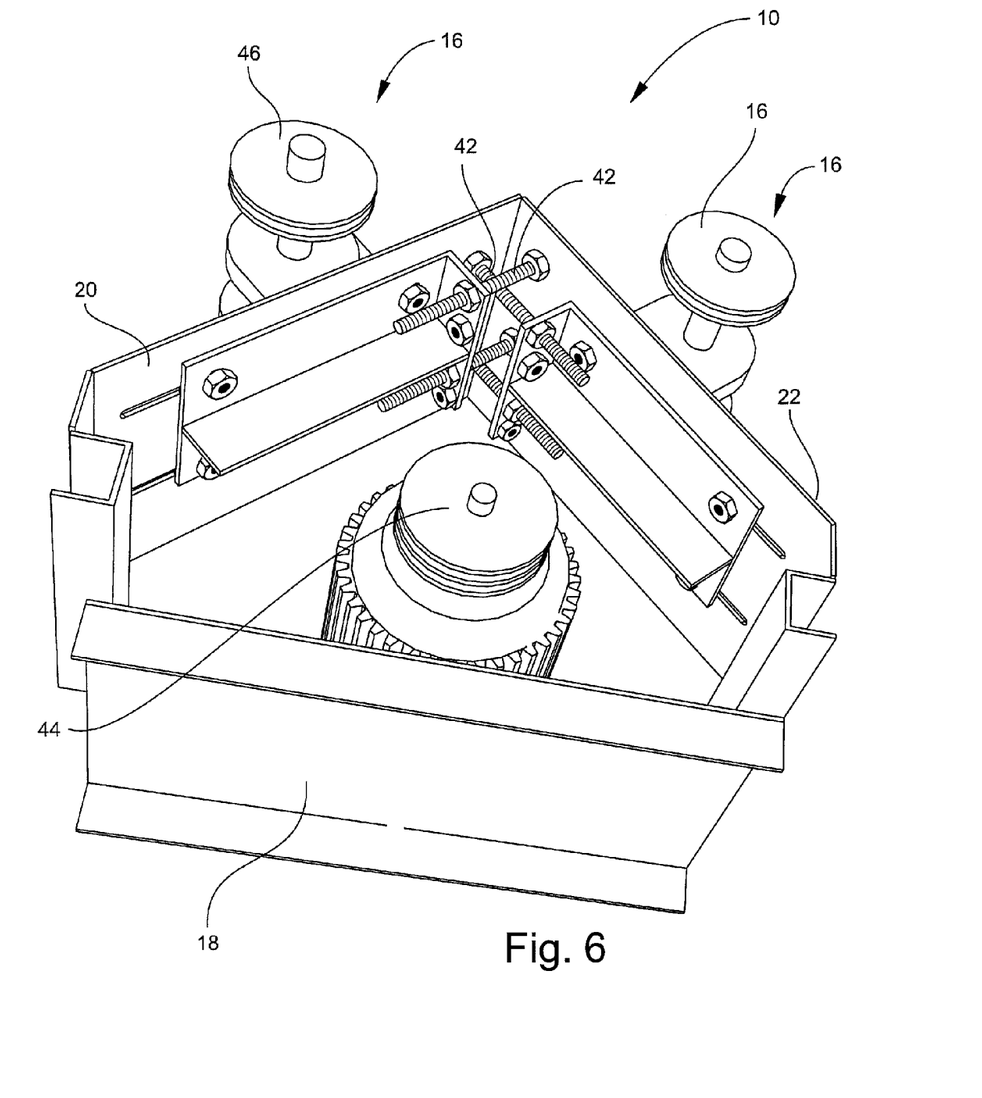
FIG. 6 is a perspective view of the compressed air device.
Figure 7:
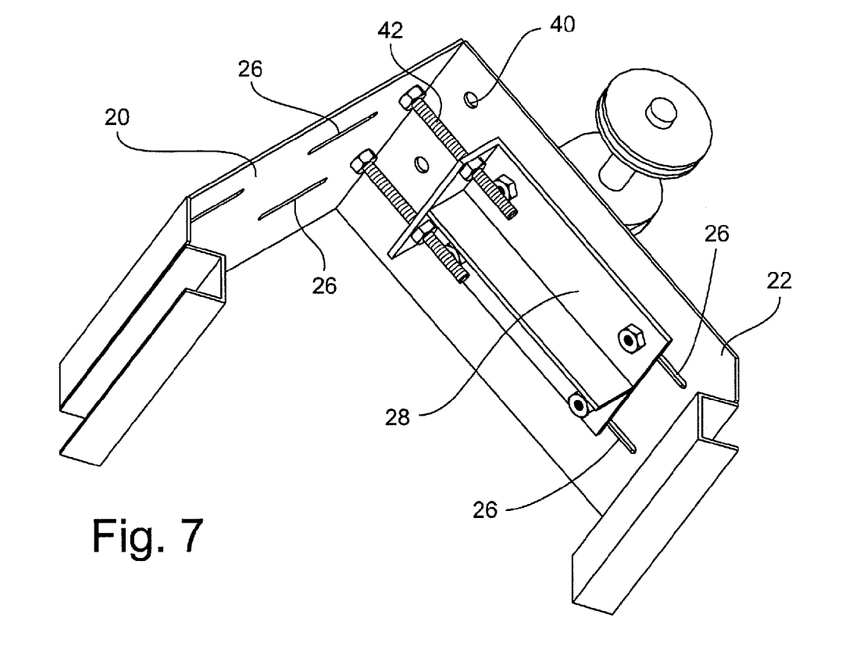
FIG. 7 is a view of several components of the compressed air device.

The second side 20 and third side 22 of the base 12 contain a hole 40 positioned in close proximity to the area where the second side 20 and third side 22 are engaged, as shown in FIG. 7. A threaded fastener 42 is received within the hole 40. The threaded fastener may be a bolt, screw, or the like. As illustrated in FIGS. 3-8, the threaded fastener 42 is designed to be inserted into the threaded bore 38 positioned on the lip 32 of the adjusting plate 28. The threaded fastener 42 received within the hole 40 positioned on the second side 20 is received within the threaded bore 38 of an adjusting plate 28 positioned beneath the bottom side of the third side 22. Likewise, the threaded fastener 42 received within the hole 40 positioned on the third side 22 is received within the threaded bore 38 of an adjusting plate 28 positioned beneath the bottom side of the second side 20.

Figure 4:
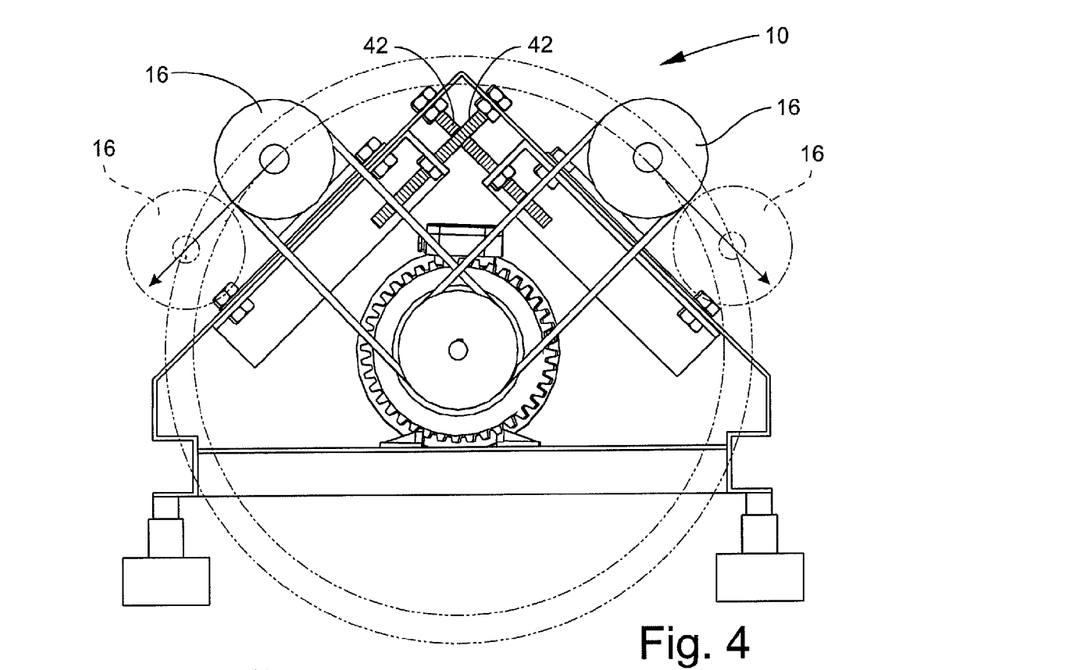
FIG. 4 is a front view of the compressed air device depicting the translation of the compressors.

During use, the threaded fastener 42 is rotated, causing the adjusting plate 28 to translate or adjust along the side (20, 22) of the base 12. Preferably, the device 10 will include a pair of threaded fasteners 42 that are received within a pair of threaded bores 38 disposed on the lip 32 of the adjusting plate 28. Therefore, when both of the threaded fasteners 42 are rotated, the adjusting plate 28 translates or adjusts along the side (20, 22) of the base 12, as illustrated in FIGS. 4 and 5. It should be noted that the term translates or adjust means that the adjusting plate 28 moves relative to the side (20, 22). By way of example only, as shown in FIG. 5, the adjusting plate 28 moves a distance "d", causing the center point of the compressor to move a distance "x" from the motor 14. The side (20, 22) is stationary and the adjusting plate 28 moves relative to the side (20, 22). In one embodiment, as the threaded fasteners 42 are rotated in the clockwise position, the adjusting plate 28 moves upwards or towards the juncture where the second side 20 and third side 22 are engaged. As the threaded fasteners 42 are rotated counterclockwise, the adjusting plate 28 moves downward or toward the first side 18. Since the compressors 16 are engaged to the adjusting plates 28, the position of the compressors 16 are adjusted by the movement of the adjusting plate 28.

Figure 2:
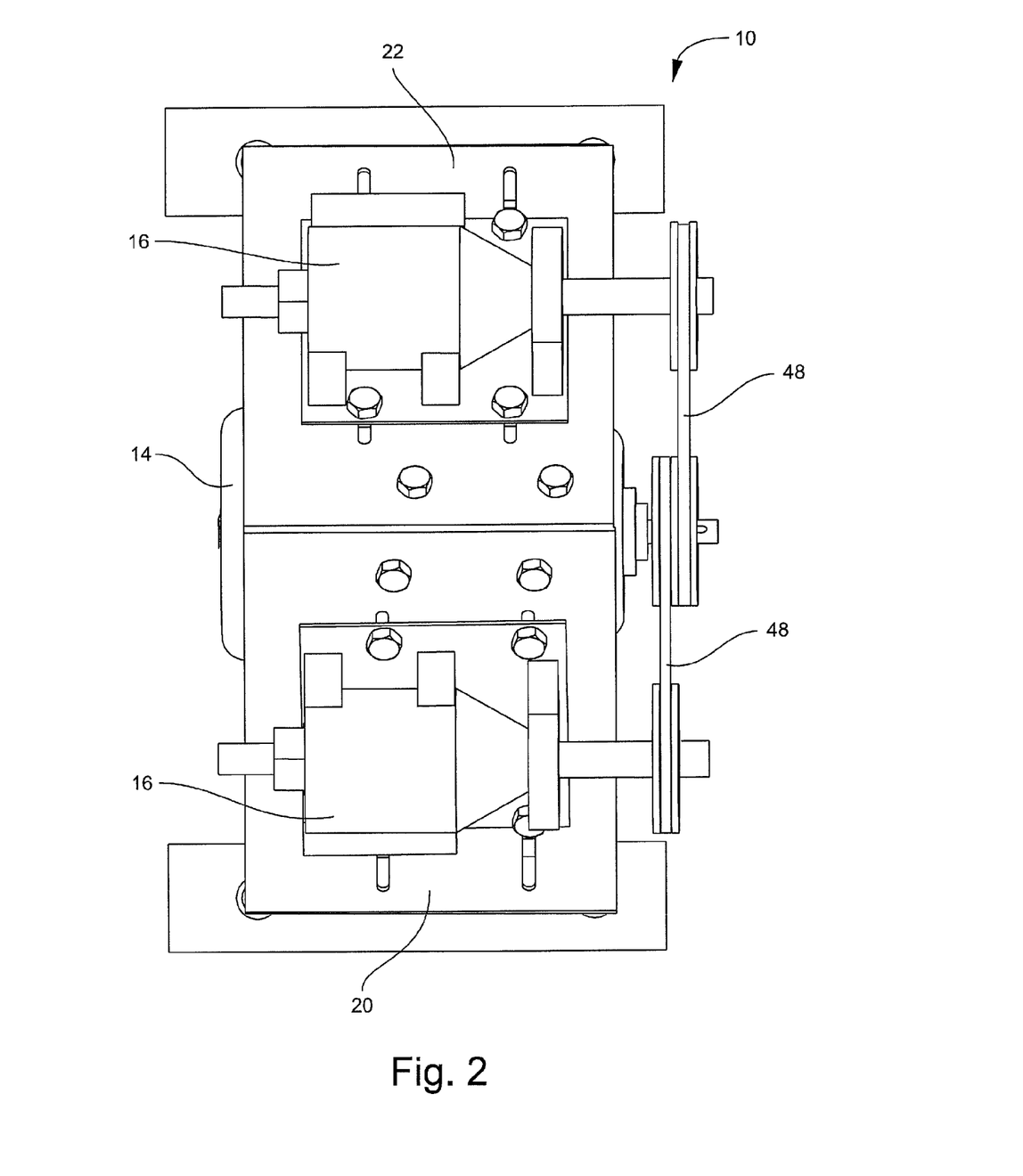
FIG. 2 is a top view of the compressed air device.
Figure 3:
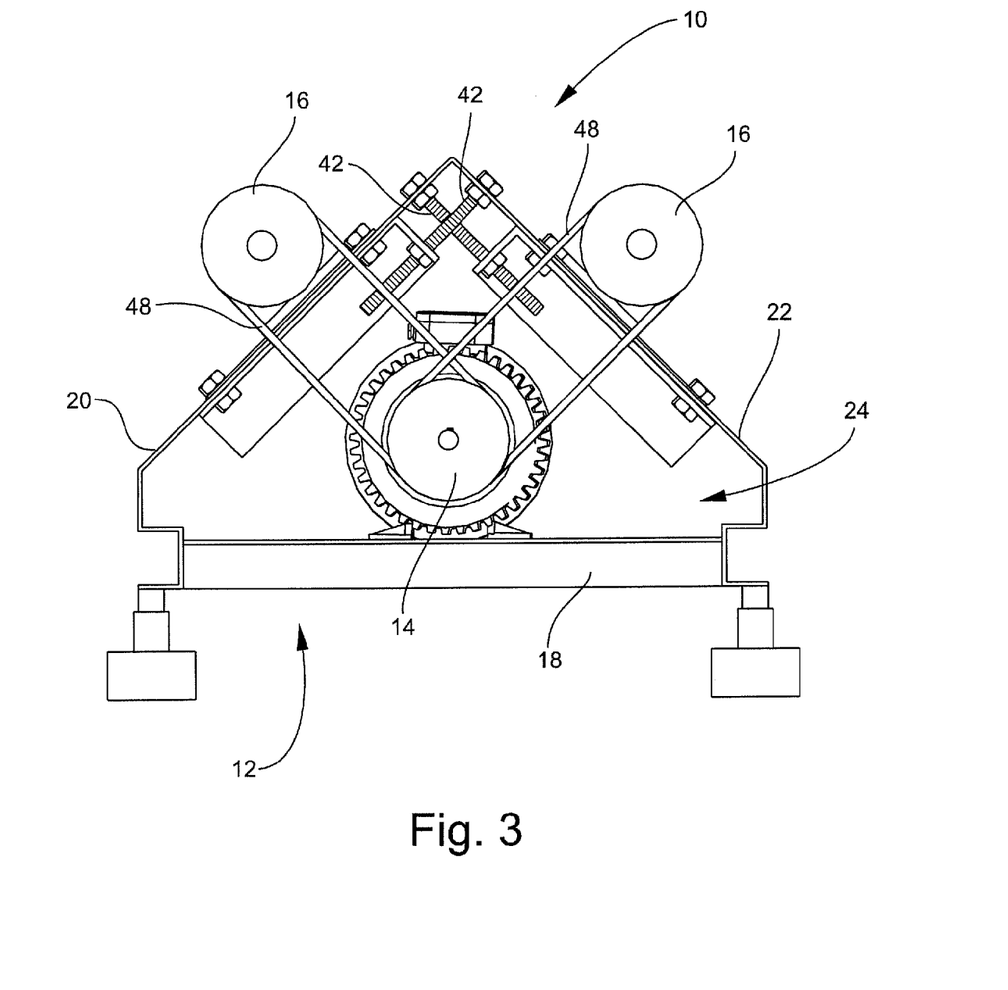
FIG. 3 is a front view of the compressed air device.

As illustrated in FIG. 6, the motor 14 includes a drive wheel 44 and each compressor 16 includes a slave wheel 46. A belt 48, as shown in FIGS. 2 and 3, is positioned on the drive wheel 44 and the slave wheel 46, allowing the motor 14 to supply rotational energy to the compressor 16 for operating the compressor 16. For the device 10 to run efficiently, economically, and smoothly, the belts 48 must contain the optimum amount of tension. During the rotation of the threaded fasteners 42, the compressors 16 are adjusted for providing the optimum amount of tension in the belts 48, as illustrated in FIGS. 4 and 5. Additionally, a protection shield may be positioned over the drive wheel 44, slave wheel 46, and the belts 48 to protect the safety of user of the device from getting limbs, hair, or clothing tangled with the gears (44, 46) and belts 48. The protection shield also reduces the amount of dirt or debris that enters the wheel (44, 46) and belts 48.

As illustrated in FIG. 1, a mounting foot 52 may be engaged to the device 10 for selectively securing the device 10 to a structure. The mounting foot 52 may be selectively secured to the device 10 by fasteners, such as a bolt, and the mounting foot 52 may be selectively secured to the structure by a fastener, such as a bolt. As illustrated, the mounting foot 52 may be selectively secured to the first side 18, second side 20, or third side 22 of the base 12.

In another alternative embodiment of the present invention as shown in FIG. 10, the base 112 may have a generally trapezoidal shape. In other words, the base 112 may have four sides. The only difference between this embodiment and the embodiment described above is the fourth side 154. The motor may be positioned on the fourth side 154 or within the cavity.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A device for expeditiously adjusting a drive belt comprising:
    a base having a generally triangular shape with at least a first side having a top portion and a bottom portion, a second side having a top portion and a bottom portion, and a third side having a top portion and a bottom portion, wherein the first side, second side, and third side collectively form a cavity therein;
    a motor disposed within the cavity of the base and engaged to the first side of the base and centrally located on the first side;
    a first compressor slidingly engaged to the second side of the base and a second compressor slidingly engaged to the third side of the base;
    at least one pair of slots disposed on the second side of the base and at least one pair of slots disposed on the third side of the base for receiving a bolt engaged to the first compressor and the second compressor;
    a first adjusting plate positioned on the bottom portion of the second side of the base that is engaged to the first compressor; and
    a second adjusting plate positioned on the bottom portion of the third side of the base that is engaged to the second compressor.

2. A device for expeditiously adjusting a drive belt comprising:
    a base having a generally triangular shape with at least a first side having a top portion and a bottom portion, a second side having a top portion and a bottom portion, and a third side having a top portion and a bottom portion, wherein the first side, second side, and third side collectively form a cavity therein;
    a motor disposed within the cavity of the base and engaged to the first side of the base;
    a first compressor slidingly engaged to the second side of the base and a second compressor slidingly engaged to the third side of the base;
    at least one pair of slots disposed on the second side of the base and at least one pair of slots disposed on the third side of the base for receiving a fastener engaged to the first compressor and the second compressor;
    a first adjusting plate positioned on the bottom portion of the second side of the base that is engaged to the first compressor, the first adjusting plate having a first end and a second end, wherein the first end contains a lip with a bore for receiving a fastener selectively secured to third side of the base; and
    a second adjusting plate positioned on the bottom portion of the third side of the base that is engaged to the second compressor, the second adjusting plate having a first end and a second end, wherein the first end contains a lip with a bore for receiving a fastener selective secured to the second side of the base.

3. The device of claim 2, further comprising a belt that is disposed between the at least one compressor and the motor, whereby the belt is mounted to a drive wheel of the motor and a slave wheel on the compressor for operating the at least one compressor.

4. The device of claim 2, further comprising at least one mounting foot that is engaged to the base for selectively securing the device to a structure.

5. A device for producing compressed air that allows for the expeditious adjustment of a drive belt comprising:
    a base having a generally triangular shape with at least a first side having a top portion and a bottom portion, a second side having a top portion and a bottom portion, and a third side having a top portion and a bottom portion, wherein the first side, second side, and third side collectively form a cavity therein;
    a motor disposed within the cavity of the base and engaged to the first side of the base;
    a first compressor slidingly engaged to the second side of the base and a second compressor slidingly engaged to the third side of the base;
    at least one pair of slots disposed on the second side of the base and at least one pair of slots disposed on the third side of the base for receiving a fastener engaged to the first compressor and the second compressor;
    a first adjusting plate positioned on the bottom portion of the second side of the base that is engaged to the first compressor; and
    a second adjusting plate positioned on the bottom portion of the third side of the base that is engaged to the second compressor.

6. The device of claim 5, further comprising two pairs of slots disposed on the second side of the base and two pairs of slots disposed on the third side of the base for receiving a fastener engaged to the first compressor and the second compressor.

7. The device of claim 5, wherein the motor is positioned on the top portion of the first side of the base.

8. The device of claim 5, wherein a belt mounted between the first compressor and motor and a belt mounted between the second compressor and motor, whereby the belts are mounted to a drive wheel of the motor and a compressor wheel on the first compressor and the second compressor.

9. The device of claim 5, further comprising at least one threaded fastener engaged to the first adjusting plate for adjusting the first adjusting plate with respect to the second side of the base and at least one threaded fastener engaged to the second adjusting plate for adjusting the second adjusting plate with respect to the third side of the base.

10. The device of claim 5, further comprising two threaded fasteners engaged to the first adjusting plate for adjusting the first adjusting plate with respect to the second side of the base and two threaded fasteners engaged to the second adjusting plate for adjusting the second adjusting plate with respect to the third side of the base.

11. The device of claim 5, further comprising a bore disposed within the third side of the base for receiving at least one threaded fastener that is engaged to a correspondingly threaded bore of the first adjusting plate and a bore disposed within the second side of the base for receiving at least one threaded fastener that is engaged to a correspondingly threaded bore of the second adjusting plate.

* * * * *